(12) United States Patent
Endo et al.

(10) Patent No.: US 8,008,411 B2
(45) Date of Patent: Aug. 30, 2011

(54) PROTON-CONDUCTIVE MATERIAL, PROTON-CONDUCTIVE ELECTROLYTE FOR FUEL CELL COMPRISING THE MATERIAL AND FUEL CELL EMPLOYING THE ELECTROLYTE

(75) Inventors: Hiroko Endo, Yokohama-si (JP); Hiroyuki Nishide, Tokyo (JP); Atsuo Sonai, Yokohama-si (JP); Takahiro Tago, Tokyo (JP)

(73) Assignee: Samsung SDI Co., Ltd., Suwon-si, Gyeonggi-do (KR)

( * ) Notice: Subject to any disclaimer, the term of this patent is extended or adjusted under 35 U.S.C. 154(b) by 1152 days.

(21) Appl. No.: 11/684,292

(22) Filed: Mar. 9, 2007

(65) Prior Publication Data
US 2007/0259239 A1 Nov. 8, 2007

(30) Foreign Application Priority Data

Mar. 9, 2006 (JP) ................................ 2006-064141
Jun. 13, 2006 (KR) ........................ 10-2006-0053140

(51) Int. Cl.
*C08G 79/02* (2006.01)
*C08G 79/04* (2006.01)
*H01M 8/10* (2006.01)
*C08F 283/08* (2006.01)

(52) U.S. Cl. ........ 525/538; 525/434; 429/482; 429/479; 429/491; 429/492; 429/493; 429/494; 429/514

(58) Field of Classification Search .................. 525/538, 525/434; 429/33, 479, 491, 492, 493, 482, 429/494, 514
See application file for complete search history.

(56) References Cited

U.S. PATENT DOCUMENTS

2005/0159562 A1 7/2005 Hayashi et al.

FOREIGN PATENT DOCUMENTS

| JP | 40-24398 | 10/1965 |
| JP | 61-207433 | 9/1986 |
| JP | 2005-171087 | 6/2005 |

OTHER PUBLICATIONS

Chinese Office Action issued Feb. 5, 2010, in corresponding Chinese Patent Application No. 2007100079564.
"Anti-wear and friction reducing additives composed of *ortho*-phenylene phosphate-amine salts for polyether type base stocks," Ichiro Minami et al., Elsevier Sciences, *Tribology International* vol. 31, No. 6, pp. 305-312, 1998.
Office Action issued by the Japanese Patent Office on Oct. 20, 2009 in corresponding Japanese Patent Application No. 2006-064141.
Third Chinese Office Action in CN 200710007956.4, dated Nov. 1, 2010 (Endo, et al.).

*Primary Examiner* — Duc Truong
(74) *Attorney, Agent, or Firm* — Lee & Morse, P.C.

(57) ABSTRACT

The present teachings encompass proton-conductive material comprising a new polymer compound. A proton-conductive electrolyte comprising the proton-conductive material, and a fuel cell comprising the proton-conductive electrolyte are disclosed. A proton-conductive material comprising poly (phosphophenylene oxide) that comprises polyphenylene oxide as the main chain, and at least one phosphonic acid group as a side chain of the main chain, a proton-conductive electrolyte comprising the proton-conductive material, and a fuel cell employing the proton-conductive electrolyte, are also disclosed.

21 Claims, 2 Drawing Sheets

PROTON-CONDUCTIVE MATERIAL, PROTON-CONDUCTIVE ELECTROLYTE FOR FUEL CELL COMPRISING THE MATERIAL AND FUEL CELL EMPLOYING THE ELECTROLYTE

CROSS-REFERENCE TO RELATED APPLICATIONS

This application claims the benefit of Japanese Patent Application No. 2006-064141, filed on Mar. 9, 2006, in the Japanese Patent Office, and Korean Patent Application No. 2006-53140, filed on Jun. 13, 2006, in the Korean Patent Office, the disclosure of which is incorporated herein in its entirety by reference.

BACKGROUND OF THE INVENTION

1. Field of the Invention

Aspects of the present invention relate to a proton-conductive material comprising a new polymer compound, a proton-conductive electrolyte comprising the proton-conductive material, and a fuel cell employing the proton-conductive electrolyte. In some embodiments the present teachings comprise a proton-conductive material comprising a new polymer compound that has high proton conductivity, has good heat resistance, and chemical stability due to good membrane formation properties. Another aspect of the present invention is that the proton-conductive material can be prepared by fewer process operations, and/or under mild conditions, a further aspect of the present invention includes a proton-conductive electrolyte comprising the proton-conductive material, and a fuel cell employing the proton-conductive electrolyte.

2. Description of the Related Art

Fluorinated polyethylene sulfonic acids are widely and industrially used for salt electrolysis, sea water desalination, water treatment, and forming proton-conductive membranes, etc. Examples of proton-conductive membranes include NAFION® membranes, FLEMION® membranes, ACIPLEX® membranes, DOW® membranes, etc. The membranes are obtained by synthesis and polymerization employing a variety of processes. However, these membranes contain fluorine, and are also expensive.

In addition, polystyrene sulfonic acids are often used to form an ion exchange resin, or an ion exchange membrane for water treatment, and the polystyrene is sulfonized in a severe condition of fuming sulfuric acid, thereby having a negative impact on the environment.

Japanese Patent Laid-open Publication No. 2005-171087 discloses poly(sulfonate alkoxy phenylene oxide) that has high proton conductivity, and excellent film formation properties, and can be synthesized under mild conditions compared to polymers containing various sulfonic acid groups. The film can be useful as a proton-conductive electrolyte membrane for an inexpensive fuel cell.

However, a sulfonic acid group of the poly(sulfonate alkoxy phenylene oxide) starts to decompose at around 200° C. Therefore, the sulfonic acid group may decompose when the corresponding fuel cell is used for a long period of time. As a result, proton conductivity is degraded.

SUMMARY OF THE INVENTION

Some aspects of the present invention relate to a proton-conductive material. The proton-conductive material can be a substitute for a proton-conductive material including a sulfonic acid group, as conventionally used in the art. The proton-conductive material in some embodiments includes a new polymer compound. The new polymer compound can be obtained by preparing a polymer compound including a phosphoric acid group having higher thermal and chemical stability compared to a sulfonic acid compound. The polymer can be prepared using fewer processes, and under mild conditions. The polymer compound can be used as a proton-conductive electrolyte composed of the proton-conductive material, and a fuel cell employing the proton-conductive electrolyte.

According to an aspect of the present invention, there is provided a proton-conductive material comprising poly(phosphophenylene oxide), that comprises a chemical structure wherein polyphenylene oxide is the main chain, and at least one phosphonic acid group is a side chain connected to the main chain.

According to some embodiments, the poly(phosphophenylene oxide) is a random copolymer represented by Formula 1 below:

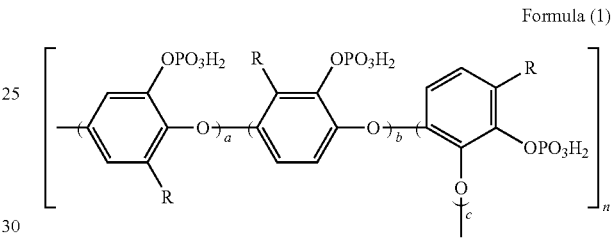

Formula (1)

where the R group comprises any one of a hydrogen atom, an alkyl group, an ester group, a phenyl group, a carboxylic acid group, a sulfonic acid group, a sulfoamidic acid group, and a phosphoric acid group, n is an integer in the range of 100-100,000, and a, b, and c refer to a ratio of 3 compounds in a parenthesis of Formula 1 and a ratio of a to b+c is in the range of 3:5-6:2.

In some embodiments, the poly(phosphophenylene oxide) is synthesized by oxidizing and polymerizing phosphophenols represented by Formula 2 and Formula 3 below:

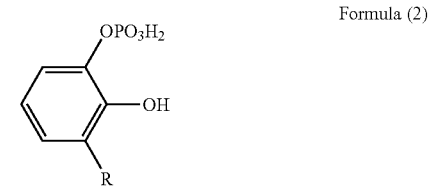

Formula (2)

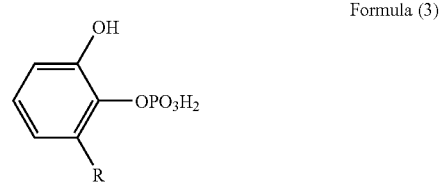

Formula (3)

where the R group can comprise any one of a hydrogen atom, an alkyl group, an ester group, a phenyl group, a carboxylic acid group, a sulfonic acid group, a sulfoamidic acid group, and a phosphoric acid group.

In the proton-conductive material, the phosphophenol may be synthesized by a one-step process by reacting catechols represented by Formula (4) below with diphosphorus pentoxide:

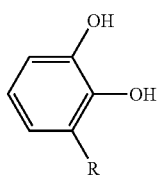

Formula (4)

where the R group can comprise any one of a hydrogen atom, an alkyl group, an ester group, a phenyl group, a carboxylic acid group, a sulfonic acid group, a sulfoamidic acid group, and a phosphoric acid group.

In various embodiments in the proton-conductive material, the catechols represented by Formula 3 are catechol (the R group consists of a hydrogen atom).

In other embodiments in the proton-conductive material, the catechols represented by Formula 3 are 3-methyl catechol.

According to another aspect of the present invention, there is provided a proton-conductive electrolyte for use in a fuel cell. The fuel cell can comprise at least one proton-conductive material.

According to still another aspect of the present invention, a fuel cell is provided, comprising a pair of electrodes, and an electrolyte membrane disposed between the electrodes. The electrolyte membrane can be the proton-conductive electrolyte as described above.

In some embodiments, the fuel cell, a proton-conductive electrolyte is included in a portion of the electrode.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings in which.

DETAILED DESCRIPTION OF THE EMBODIMENTS

Figure 1:
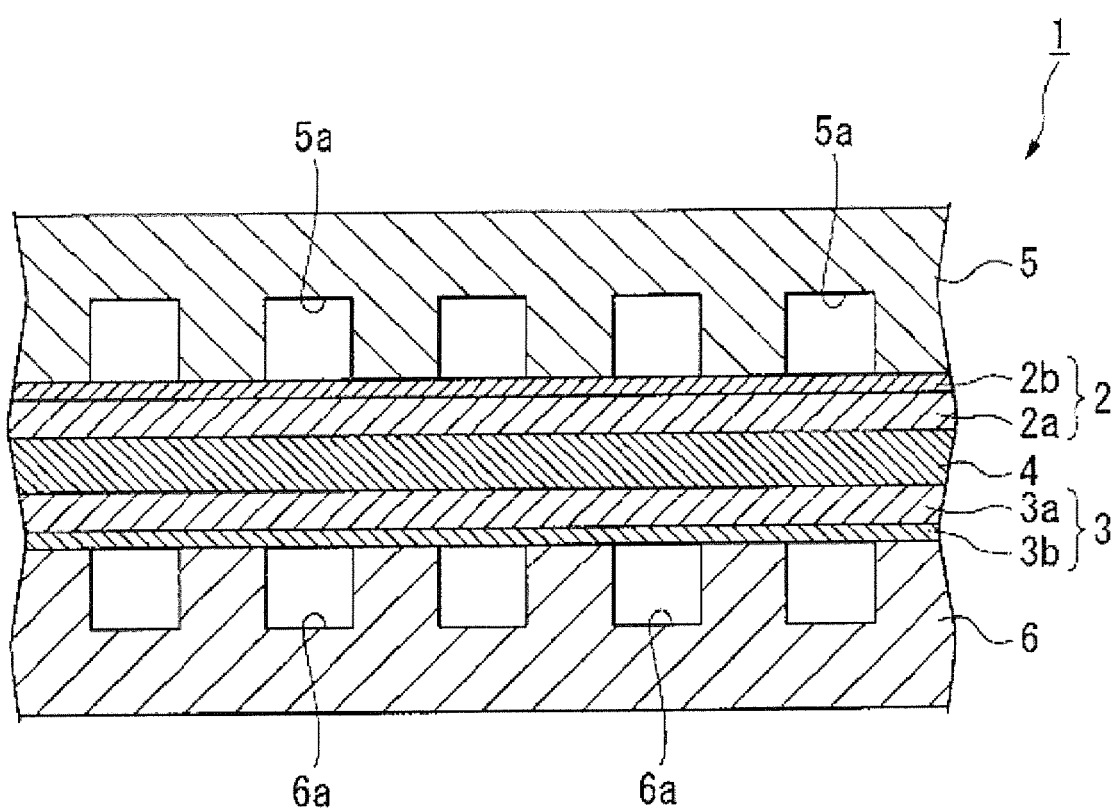
FIG. 1 is a cross-sectional view of a unit cell structure of a fuel cell according to an embodiment of the present invention.

Reference will now be made in detail to various embodiments of the present invention, examples of which are illustrated in the accompanying drawings, wherein like reference numerals refer to the like elements throughout. The embodiments are described below in order to explain the present invention by referring to the figures.

Proton-Conductive Material (Proton-Conductive Electrolyte)

According to an embodiment of the present invention, poly(phosphophenylene oxide) was prepared using the fact that catechols react easily with diphosphorus pentoxide, at a high rate to produce phosphophenol. Although the catechols have a phosphoric acid group, having an electron attraction property, the catechols can be oxidized and polymerized at a high rate, under mild conditions, using water as a polymerization solvent. Furthermore, such materials can have a high ion exchange capacity, and a high proton conductivity.

For example, a proton-conductive material, according to various embodiments of the present invention, comprises poly(phosphophenylene oxide), that comprises a main chain comprising polyphenylene oxide subunits, and one or more side chains or side groups, comprising one or more phosphonic acid subunits.

Poly(phosphophenylene oxide) is a random copolymer having a structural formula represented by Formula 1 below, where the R group can comprise any one of a hydrogen atom, an alkyl group, an ester group, a phenyl group, a carboxylic acid group, a sulfonic acid group, a sulfoamidic acid group, and a phosphoric acid group, and the like. The n can represent an integer in the range of 100-100,000, and a, b, and c refer to the 3 compounds in the parenthesis of Formula 1. The poly(phosphophenylene oxide) can comprise ratio of a to (b+c) which can be in the range of from about 3:5 to about 6:2.

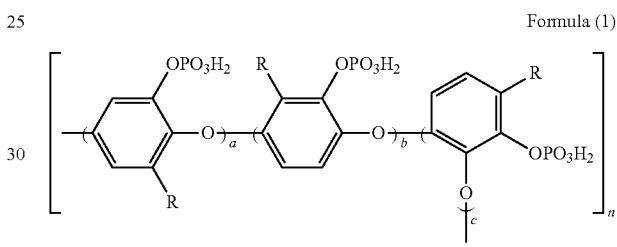

Formula (1)

In some embodiments, and as represented in Formula 1, the poly(phosphophenylene oxide) includes a group comprising at least three aromatic rings, wherein each group is randomly copolymerized. Each group can comprise the same starting material as described herein. Each group can be a structural isomer of another group.

The abundance of each group in the poly(phosphophenylene oxide) is represented by a ratio of the relative amounts of a, b, and c. The ratio of a, b, and c is a molar ratio, and can be represented by the ratio a:(b+c). The ratio of a:(b+c) in some embodiments is preferably in the range of from about 3:5 to about 6:2, or from about 4:4 to about 5:3. In some embodiments the ration of a:(b+c) is about 5:3. The ratio of b to c can be in the range of from about 1:1 to about 1:10, or from about 1:1.5 to about 1:5. In some embodiments the ration of b to c is about 1:2.

According to some embodiments, a, b, and c, are respectively determined by a reaction yield of intermediates in a process of preparing poly(phosphophenylene oxide), and do not largely affect proton conductivity. Therefore, although the ratio of a, b, and c can be changed, proton conductivity does not necessarily change.

In some embodiments, an average polymerization of poly(phosphophenylene oxide), n is preferably in the range of from about 100 to about 100,000 subunits. When n is 100 or more, the number of phosphonic acid groups can be considered substantial, although proton conductivity is not reduced. When n is 100,000 or less, an average molecular weight of total poly(phosphophenylene oxide) is not excessive, solubility with respect to a solvent is not reduced, membrane formation by a casting method is improved, and a proton-conductive material can be used in a desired form.

A proton-conductive material according to various embodiments of the present invention can comprise only poly(phosphophenylene oxide), and also, can further comprise a reinforcing agent such as polytetrafluoro ethylene, etc. The reinforcing agent can function to improve the strength of a membrane formed therewith. Furthermore, the proton-conductive material can be mixed with basic polymers, and thus can be used as an ion complex electrolyte.

Preparation Method of Proton-Conductive Material (Proton-Conductive Electrolyte)

Synthesis of the proton-conductive material is represented, for example, by Reaction Formula 1. As shown in Reaction Formula 1, catechols (i) are reacted with diphosphorus pentoxide (ii) to produce phosphophenol (iii). The phosphophenol (iii) is used as a monomer, oxidized and polymerized under mild conditions, using water as a polymerization solvent, to produce poly(phosphophenylene oxide) (iv).

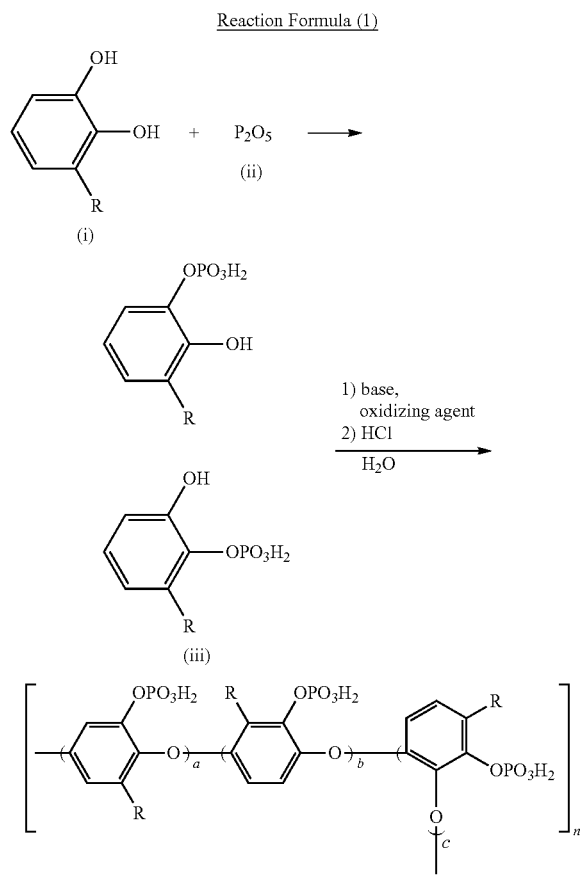

Reaction Formula 1 is described herein, in greater detail. In a first step, catechols represented by Formula 4 below are arranged. The R group in Formula 4 can comprise any one of a hydrogen atom, an alkyl group, an ester group, a phenyl group, a carboxylic acid group, a sulfonic acid group, a sulfoamidic acid group, a phosphoric acid group, and the like.

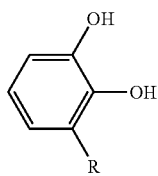

In some embodiments, catechols are reacted with diphosphorus pentoxide to synthesize phosphophenols. Phosphophenols, represented by Formulas 2 and 3 below, can be synthesized at a high rate by stirring catechols and diphosphorus pentoxide, at or above the melting point of the catechols, for several hours.

For example, as shown in Formulas 2 and 3, two types of positional isomers exist in the synthesized phosphophenols. A ratio of the isomer of Formula 2, and the isomer of Formula 3, can be a value corresponding to a ratio of a to (b+c) as described above. For example, the ratio can preferably in the range of from about 3:5 to about 6:2, or from about 4:4 to about 5:3. In some embodiments the ratio can be about 5:3.

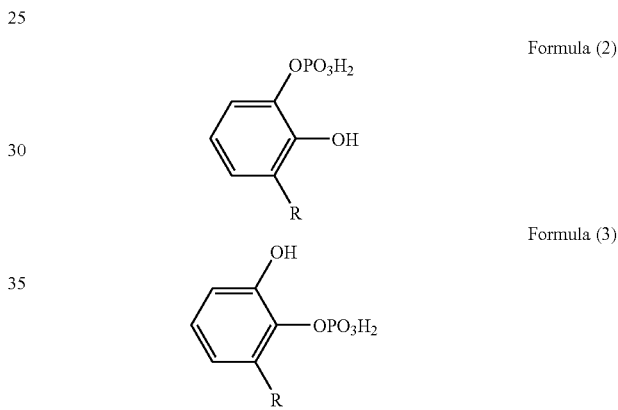

In various embodiments, the diphosphorus pentoxide unreacted after phosphophenols synthesis can be completely removed by a solvent extraction using ether and water. Unreacted catechols can also be completely removed by recrystallization using dichloromethane and ether. The di-substituted catechols can be produced in slight amounts due to steric hinderance. However, the production of the di-substituted catechols can be entirely prevented by using a molar amount of diphosphorus pentoxide. The molar amount of diphosphorus can be an amount based on stoichiometry, or less.

In some embodiments the prepared phosphophenols are oxidized and polymerized to synthesize poly(phosphophenylene oxide), an oxidizing agent is added to an aqueous alkali solution of phosphophenols, and the resulting mixture is vigorously stirred at room temperature and atmospheric pressure for about 12-24 hours or more.

A constituent of an alkali solution can be a base. The base may be, for example, a strong base such as sodium hydroxide or potassium hydroxide. The amount of base in a polymerization solution can be the same molar amount as the phosphophenol monomer.

In some embodiments an oxidizing agent can be used. The oxidizing agent can comprise silver oxide, lead oxide, manganese oxide, a copper amine complex, an iron amine complex, a manganese amine complex, potassium hexacyanoferrate, combinations thereof, and the like. When metal oxides such as silver oxide, are used, the oxidizing agent can be easily removed by filtration or centrifugation, after oxidation and polymerization.

In some embodiments of the phosphophenols isomers of Formula 2, the p-position of the phenol group has highest reaction activity. In other embodiments, for example, in the phosphophenols isomer of Formula 3, the m-position of a phosphonic acid group ($OPO_3H_2$) has the highest reaction activity, and p-position of a phenol group has a high reaction activity. Therefore, as shown in Formula 1, poly(phosphophenylene oxide) synthesized by monomers comprising these isomers can be in a form in which the 3 groups are randomly polymerized.

According to an embodiment of the present invention a proton-conductive material comprising poly(phosphophenylene oxide) is synthesized.

A proton-conductive material according to an embodiment of the present invention may comprise only poly(phosphophenylene oxide), or also may further comprise a reinforcing agent such as polytetrafluoro ethylene, for example. The reinforcing agent can function to improve the strength of a membrane formed thereof. Furthermore, the proton-conductive material can be mixed with basic polymers, and thus can be used as an ion complex electrolyte. The proton conductive material can be in the form of a membrane having a thickness of from about 30 μm to about 100 μm.

Fuel Cell

A fuel cell according to some embodiments of the present invention will now be described more fully, with reference to the accompanying drawings.

FIG. 1 is a cross-sectional view of a unit cell of a fuel cell 1 according to an embodiment of the present invention. In FIG. 1, the fuel cell 1 includes an oxygen electrode 2, a fuel electrode 3, a proton-conductive electrolyte membrane 4 disposed between oxygen electrode 2 and fuel electrode 3, an oxidizing agent separator 5, having oxidizing agent flow paths 5a disposed on the external surface of the oxygen electrode 2, and a fuel separator 6, having fuel flow paths 6a disposed on the external surface of the fuel electrode 3. The fuel cell 1 can be operated at a temperature of 100-200° C. The fuel cell 1 can be operated in a non-humidified environment, or in an environment with a relative humidity of about 50% or less.

The fuel electrode 3, and the oxygen electrode 2, can comprise porous catalyzing layers 2a and 3a, and porous carbon sheets 2b and 3b, that respectively support each of the porous catalyzing layers 2a and 3a. The porous catalyzing layers 2a and 3a can comprise an electrode catalyst, a hydrophobic binder for solidifying and shaping the electrode catalyst, and/or a conducting agent.

According to some embodiments, the electrode catalyst can comprise any metal that catalyzes an oxidation reaction of hydrogen, and/or a reduction reaction of oxygen. Examples of the electrode catalyst are lead (Pb), iron (Fe), manganese (Mn), cobalt (Co), chrome (Cr), gallium (Ga), vanadium (V), tungsten (W), ruthenium (Ru), iridium (Ir), palladium (Pd), platinum, rhodium (Rh) alloys thereof, and the like. These metals or alloys can be supported on activated carbon to constitute the electrode catalyst.

The hydrophobic binder can be a fluoro resin. For example, a fluoro resin having a melting point of 400° C. or less, can be used. Such fluoro resin can be a resin having good hydrophobic properties and heat resistance, such as polytetrafluoro ethylene, tetrafluoroethylene-perfluoroalkyl vinyl ether copolymer, poly vinylidene fluoride, tetrafluoroethylene-hexafluoroethylene copolymer, perfluoroethylene, etc. By adding a hydrophobic binder, the catalyzing layers 2a and 3a can be prevented from excessive wetting by water generated during an electricity generating reaction. Diffusion inhibition of fuel gases and oxygen inside of the fuel electrode 3, and the oxygen electrode 2, can be prevented.

In some embodiments, a conducting agent can comprise any electricity-conducting material, for example, any kind of metal or carbon material. For example, the conducting agent can comprise: carbon black, such as acetylene black, etc.; activated carbon and graphite; or a combination thereof.

According to various embodiments, the catalyzing layers 2a and 3a can comprise the proton-conductive electrolyte according to various embodiments of the present invention, without the hydrophobic binder, or with the hydrophobic binder. By adding the proton-conductive electrolyte according to various embodiments of the present invention, proton conductivity in the fuel electrode 3, and the oxygen electrode 2, can be improved. Additionally, the internal resistance of the fuel electrode 3 and the oxygen electrode 2 can be reduced.

In some embodiments, the oxidizing agent separator 5, and the fuel separator 6, are formed of a conductive metal, and are joined to the oxygen electrode 2, and the fuel electrode 3. The oxidizing agent separator agent 5, and the fuel separator 6, can act as a current collectors, and can supply oxygen and fuel gases to the oxygen electrode 2, and fuel electrode 3, respectively. A fuel, for example a hydrogen gas, can be supplied to the fuel electrode 3, via the fuel flow paths 6a of the fuel separator 6, and an oxidizing agent, for example oxygen, can be supplied to the oxygen electrode 2, via the oxidizing agent flow paths 5a of the oxidizing agent separator 5. In addition, the hydrogen supplied as a fuel may be hydrogen produced by modification of a hydrocarbon or an alcohol, and the oxygen supplied as an oxidizing agent may be oxygen from the atmosphere.

In the fuel cell 1, hydrogen is oxidized at the fuel electrode 3 to produce protons, that migrate to the oxygen electrode 2, via the electrolyte membrane 4. The migrated protons electrochemically react with oxygen to produce water, thereby producing electrical energy.

The fuel cell according to various embodiments of the present invention can exhibit a good electricity generating performance, for a long period of time, at an operating temperature of from about 70° C. to about 100° C., and can be properly used in vehicles, for power generation at home, or for portable power generation applications.

EXAMPLE 1

Synthesis of Methyl Phosphophenol

In a first operation, 5.61 g (40 mmol) of 3-methyl catechol was added to a 100 ml three-neck flask, heated over a melting point of 95° C. until melted. Then, while the resulting product was stirred with a stirrer, 3.83 g (27 mmol) of diphosphorus pentoxide was slowly added and stirred at 95° C. for 3 hours, and then at 160° C. for one hour. After the reaction was terminated, the resulting solution was cooled to room temperature, and solidified. A solvent extraction was then performed using water and ether. As a result, unreacted diphosphorus pentaoxide remained in a water layer and a reaction product was extracted into an ether layer.

The ether solution was dried with sodium sulfate, and then the ether was removed and recrystallized with dichloromethane/ether to collect a white solid. The collected white solid was 3.92 g (yield 48%) of a mixture of 2-methyl-6-phosphophenol and its positional isomer, 2-phospho-3-methyl phenol.

The obtained white solid was identified using 1H-NMR (acetone-d6, 500 MHz, ppm) which produced a spectrum of 2-methyl-6-phosphophenol in 2.20 (s, CH3), 6.70 (t, Ph), 6.93 (d, Ph) and 7.03 (d, Ph), and produced a spectrum of its positional isomer, 2-phospho-3-methyl phenol in 2.26 (s, CH3), 6.71 (d, Ph), 6.76 (d, Ph) and 6.92 (t, Ph).

The mixing ratio of 2-methyl-6-phosphophenol and its positional isomer, 2-phospho-3-methyl phenol, was 5:3. The mixing ratio was obtained from the integral values of the spectrum of the two compounds using $^1$H-NMR.

An IR measurement produced a spectrum of a phosphoric acid group that was represented in 977, 1031, 1083, 1209, 1276 cm$^{-1}$ (vP=O), and 1619 cm$^{-1}$ (δPOH).

In ESI-MS, a spectrum was represented in 203.5 (m/e, M$^-$).
(Synthesis of Poly(Phosphophenylene Oxide))

In a further operation, 0.300 g (7.5 mmol) of sodium hydroxide and 0.305 g (1.5 mmol) of methyl phosphophenol, including the positional isomer obtained by the method as described above, were dissolved in 15 ml of water. Then, 1.74 g (7.5 mmol) of silver oxide was added, and the resulting mixture was stirred at room temperature for 24 hours. After the reaction was terminated, silver oxide was removed, and 15 ml of 10% hydrochloric acid was added to the resulting solution and stirred. Thereafter, dialysis was performed on the resulting product with water (Molecular Weight of Cut-Off: Mw=1000). The water was removed, and then the resulting product was heated and dried in reduced pressure at 70° C. for two days, to obtain 0.22 g (yield 70%) of a liqht brown solid.

The obtained light brown solid was soluble in water, hydrochloric acid, an aqueous sodium hydroxide solution, and insoluble in methanol, ethanol, acetonitrile, chloroform, hexane, benzene, toluene, N,N-dimethylformamide, N,N-dimethylacetamide, dimethylsulfoxide. 1H-NMR (D$_2$O, 500 MHz, ppm) produced a spectrum of the obtained light brown solid of 1.58-2.27 (m, CH$_3$), 6.00-7.35 (m, Ph).

In addition, an IR measurement absorption peaks of (989, 1105, 1199, 1270 cm$^{-1}$ (vP=O), 1629 cm$^{-1}$ (δPOH)) of a phosphoric acid group.

The molecular weight was Mw=1.2×10$^5$ (GPC measurement, aqueous eluent, polystyrene sulfonic acid standard).

Furthermore, a thermogravimetric analysis was performed. The results indicated a 10% pyrolysis temperature (Td$_{10\%}$) of 355° C.

The obtained poly(phosphophenylene oxide) was dissolved in water, and the resulting product was cast on a Teflon™ plate, heated, and dried at 70° C. to obtain a light brown transparent membrane having a thickness of 78 μm. Through these processes, the proton-conductive electrolyte membrane of Example 1 was prepared.
(Proton Conductivity)

Figure 2:
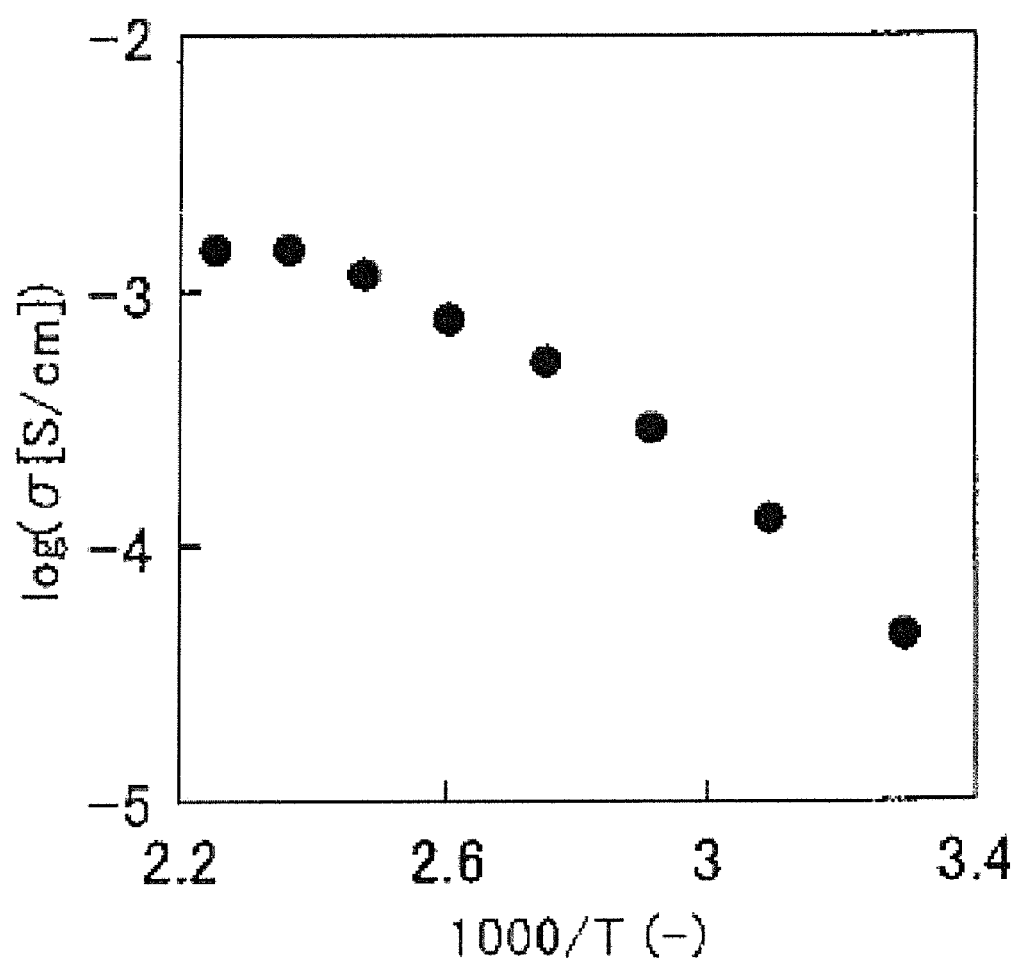
FIG. 2 is a graph showing temperature dependence of proton conductivity of a proton-conductive electrolyte membrane of Example 1, and a vertical axis denotes a common logarithm of proton conductivity σ(s/cm), a horizontal axis denotes a number obtained by multiplying an inverse number of temperature (T), by 1,000.

The proton-conductive electrolyte membrane of Example 1 was inserted into a circular plate shaped platinum electrode having a diameter of 13 mm, and proton conductivity was determined by complex impedance measurement. FIG. 2 shows temperature dependence of proton conductivity of the proton-conductive electrolyte membrane. Proton conductivity at 170° C. was 2.4×10$^{-3}$ Scm$^{-1}$.
(Fuel Cell Evaluation)

A carbon powder comprising platinum, with a platinum amount of 50% by weight of the carbon powder, was added to an aqueous solution comprising a proton-conductive electrolyte membrane of Example 1. The resulting product was fully stirred to obtain a suspension. Here, a weight ratio of platinum-supported carbon powder and proton-conductive electrolyte was controlled to obtain a ratio of 2:1. The suspension was coated onto porous carbon bodies (porosity rate 75%), and the resulting product was dried and used as a porous electrode for a fuel cell.

The obtained proton-conductive electrolyte membrane of Example 1, was inserted between a pair of the porous electrodes and used as a fuel cell. Hydrogen and air were applied as a fuel and an oxidizing agent, respectively, and a power generation test was performed at 150° C. As a result, a voltage of 0.435 V was obtained with respect to an open circuit voltage of 0.965 V, and a current density of 100 mA/cm$^2$.

EXAMPLE 2

A proton-conductive electrolyte membrane was prepared in the same manner as in Example 1, except that catechol (R of Formula 4 is a hydrogen atom) was used as a starting raw material instead of 3-methyl catechol.

EXAMPLE 3

A proton-conductive electrolyte membrane was prepared in the same manner as in Example 1, except that 3-phenyl catechol (R of Formula 4 is a phenyl group) was used as a starting raw material instead of 3-methyl catechol.

EXAMPLE 4

A proton-conductive electrolyte membrane was prepared in the same manner as in Example 1, except that 3-methoxy catechol (R of Formula 4 is a methoxy group) was used as a starting raw material instead of 3-methyl catechol.

COMPARATIVE EXAMPLE 1

In this example, 0.58 g (2 mmol) of a methyl sulfonate propoxy phenol sodium salt was dissolved in 100 ml of an aqueous solution, in which 80 mg (2 mmol) of sodium hydroxide was dissolved, to which 0.93 g (4 mmol) of silver oxide as an oxidizing agent was added, and the resulting mixture was stirred at room temperature. The solution became a brown color immediately after the silver oxide was added thereto. After 12 hours of stirring, silver oxide was filtered from the reaction solution. Water was removed under a reduced pressure to obtain a light yellow powder.

The obtained powder was washed with ethanol to remove the sodium hydroxide. The powder after washing was dissolved in 0.5 ml of water, and 500 ml of ethanol was added, and then precipitates were filtered and collected to obtain 0.41 g of a white powder, by washing with ethanol (yield 77%).

The white powder was identified. As a result, IR spectrum was performed and strong absorption (1196 cm-1, 1060 cm-1 (vSO2)) from a sulfonic acid group, and absorption (1273 cm-1, (vC-O-C)) from phenyleneether, were detected. Furthermore, 1H-NMR was performed to obtain a spectrum of the white powder at 6.02-6.56 ppm (m, 2H), 3.58 ppm (t, 2H), 2.86 ppm (t, 2H), 1.86 ppm (m, 2H), 1.80 ppm (s, 3H), and by using the spectrum, the white powder was identified as poly (methyl sulfonate propoxy phenylene oxide) sodium salt. The molecular weight was measured at 3,200 (GPC measurement, polystyrene standard, eluent: Chloroform).

0.27 g of the obtained white powder (poly(methyl sulfonate propoxy phenylene oxide) was dissolved in 10 ml of pure water, and 0.5 ml of 35% hydrochloric acid was added. Then, the resulting product was stirred for 10 minutes and protonized.

An aqueous polymer solution was cast on a TEFLON® plate, and the resulting product was dried under a reduced pressure. As a result, a flexible and strong poly(methyl sulfonate propoxy phenylene oxide) membrane having a thickness of about 60 μm was obtained.

Through these processes, a proton-conductive electrolyte membrane of Comparative Example 1, was prepared.

Example 1, a pyrolysis initiation temperature, 10% weight loss temperature (Td10), proton conductivity, and an open circuit voltage when each membrane was employed in a fuel cell, were measured.

The results are shown in Table 1, and also corresponding polymer structural formulas are shown in Table 1.

TABLE 1

| Raw materials (polymer) | Pyrolysis initiation temp. [° C.] | 10% weight loss temp. $Td_{10\%}$ [° C.] | Proton conductivity [S/cm] | Open Circuit Voltage [V] |
|---|---|---|---|---|
| Example 1 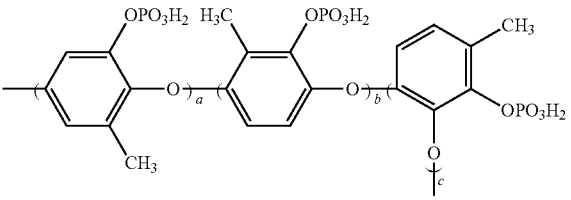 $a:(b+c) = 5:3$ | 302 | 355 | $2.4 \times 10^{-3}$ | 0.905 |
| Example 2 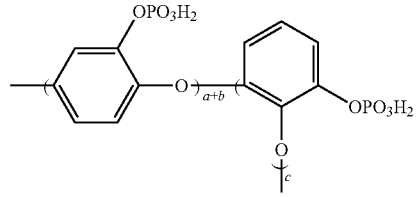 | 284 | 323 | $2.2 \times 10^{-3}$ | 0.963 |
| Example 3 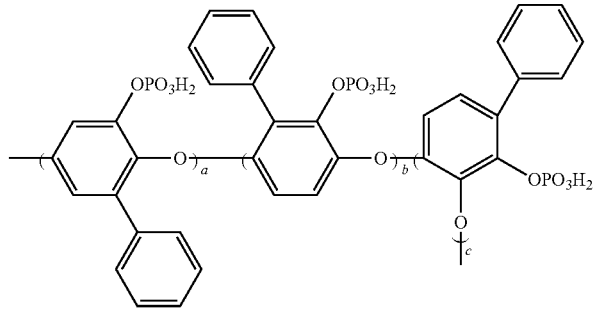 $a:(b+c) = 5:3$ | 308 | 361 | $8.7 \times 10^{-4}$ | 0.932 |
| Example 4 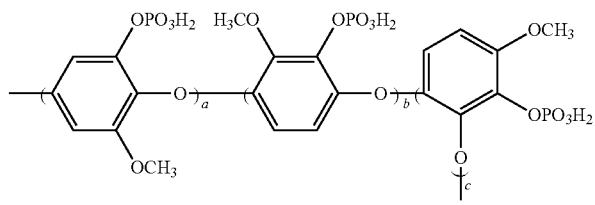 $a:(b+c) = 5:3$ | 294 | 334 | $1.4 \times 10^{-3}$ | 0.943 |
| Comparative Example 1 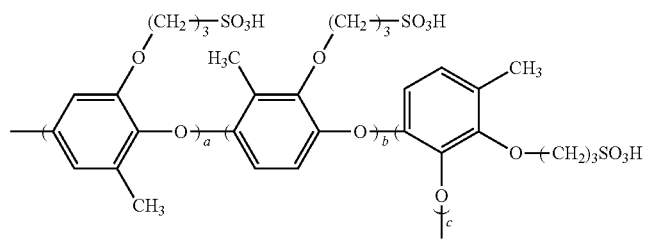 | 202 | 253 | $2.3 \times 10^{-3}$ | 0.954 |

With respect to each of proton-conductive electrolyte membranes of Examples 1 through 4, and Comparative As shown in Table 1, while proton conductivity and open circuit voltage in Examples 1 through 4, and Comparative Example 1 do not show any significant differences, a pyrolysis initiation temperature, and a 10% weight loss temperature ($Td_{10\%}$) of Comparative Example 1 are much lower than that of the Examples.

As above, the proton-conductive electrolytes of Examples 1 through 4 have better heat resistance compared to that of Comparative Example 1, thereby being suitable for an electrolyte membrane for a fuel cell.

The proton-conductive material according to various aspects of the present invention has a high proton conductivity in terms of comprising a phosphonic acid group as a side chain, which can be a substitute for fluoro polyethylene sulfonic acid conventionally used for salt electrolysis, sea water desalination, water treatment, and forming proton-conductive membranes.

In addition, the proton-conductive electrolyte has good heat resistance, thereby being able to provide a solid polymer fuel cell having high current density, high power, long lifetime in a non-humidified environment or in an environment with a relative humidity of 50% or less, at an operating temperature of 100° C. to 200° C., using the poly(phosphophenylene oxide) as an electrolyte membrane.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A proton-conductive material comprising a poly(phosphophenylene oxide) that is a random copolymer represented by Formula 1 below:

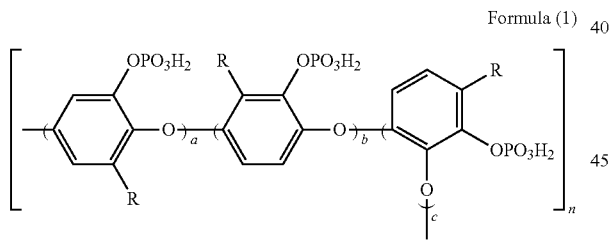

Formula (1)

wherein each R group individually comprises any one of a hydrogen atom, an alkyl group, an ester group, a phenyl group, a carboxylic acid group, a sulfonic acid group, a sulfoamidic acid group, and a phosphoric acid group, wherein n is an integer in the range of from about 100 to about 100,000;

wherein a, b, and c refer to a ratio of the three compounds in parenthesis of Formula 1; and wherein the ratio of a to b+c is in the range of from about 3:5 to about 6:2.

2. The proton-conductive material of claim 1, wherein the poly(phosphophenylene oxide) is synthesized by oxidizing and polymerizing phosphophenols represented by Formula 2 and Formula 3 below:

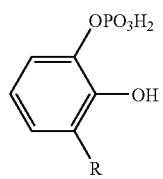

Formula (2)

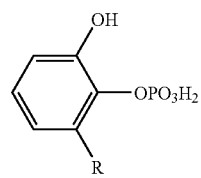

Formula (3)

wherein each R group individually comprises any one of a hydrogen atom, an alkyl group, an ester group, a phenyl group, a carboxylic acid group, a sulfonic acid group, a sulfoamidic acid group, and a phosphoric acid group.

3. The proton-conductive material of claim 2, wherein the phosphophenols are synthesized in a one-operation process by reacting a catechol represented by Formula 4 below with diphosphorus pentaoxide:

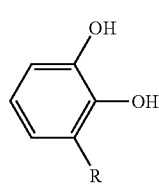

Formula (4)

wherein the R group comprises any one of a hydrogen atom, an alkyl group, an ester group, a phenyl group, a carboxylic acid group, a sulfonic acid group, a sulfoamidic acid group, and a phosphoric acid group.

4. The proton-conductive material of claim 3, wherein the R group of the catechol represented by Formula 4 consists of a hydrogen atom.

5. The proton-conductive material of claim 3, wherein the catechol represented by Formula 4 comprises 3-methyl catechol.

6. A proton-conductive electrolyte for a fuel cell comprising at least one proton-conductive material according to claim 1.

7. The proton-conductive material of claim 1, further comprising a reinforcing agent admixed with the poly(phosphophenylene oxide).

8. A fuel cell comprising:
a pair of electrodes; and
an electrolyte membrane disposed between the electrodes, wherein the electrolyte membrane includes the proton-conductive electrolyte according to claim 6.

9. The fuel cell of claim 8, wherein, at least one of the electrodes comprises the proton-conductive electrolyte.

10. The fuel cell of claim 8, further comprising, a fuel separator; and wherein,
the pair of electrodes comprises an anode, and the anode is disposed adjacent to the fuel separator.

11. The fuel cell of claim 10, wherein the fuel separator comprises a plurality of flow paths.

12. The fuel cell of claim 8, further comprising, an oxidizing agent separator; and wherein, the pair of electrodes comprises a cathode, and
the cathode is disposed adjacent to the oxidizing agent separator.

13. The fuel cell of claim 12, wherein the oxidizing agent separator comprises a plurality of flow paths.

14. The fuel cell of claim 8, wherein the electrodes each comprises a catalyzing layer and a support layer.

15. The fuel cell of claim 8, wherein the electrodes each comprises a porous carbon support layer and a porous metallic catalyst layer.

16. The fuel cell of claim 8, wherein the electrodes each comprises a hydrophobic binder.

17. A proton conductive membrane, comprising a poly (phosphophenylene oxide) that is a random copolymer represented by Formula 1 below:

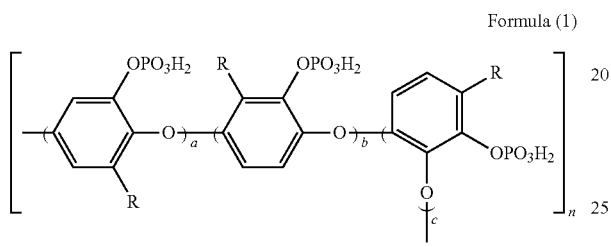

Formula (1)

wherein each R group individually comprises any one of a hydrogen atom, an alkyl group, an ester group, a phenyl group, a carboxylic acid group, a sulfonic acid group, a sulfoamidic acid group, and a phosphoric acid group, wherein n is an integer in the range of from about 100 to about 100,000;

wherein a, b, and c refer to a ratio of the three compounds in parenthesis of Formula 1; and wherein the ratio of a to b+c is in the range of from about 3:5 to about 6:2.

18. The proton conductive membrane of claim 17, wherein the membrane has a thickness of from about 30 μm to about 100 μm.

19. The proton conductive membrane of claim 17, further comprising a reinforcing agent.

20. The proton conductive membrane of claim 19, wherein the reinforcing agent comprises polytetrofluoro ethylene.

21. The proton conductive membrane of claim 17, further comprising basic polymers admixed therewith.

* * * * *